Figure 1:
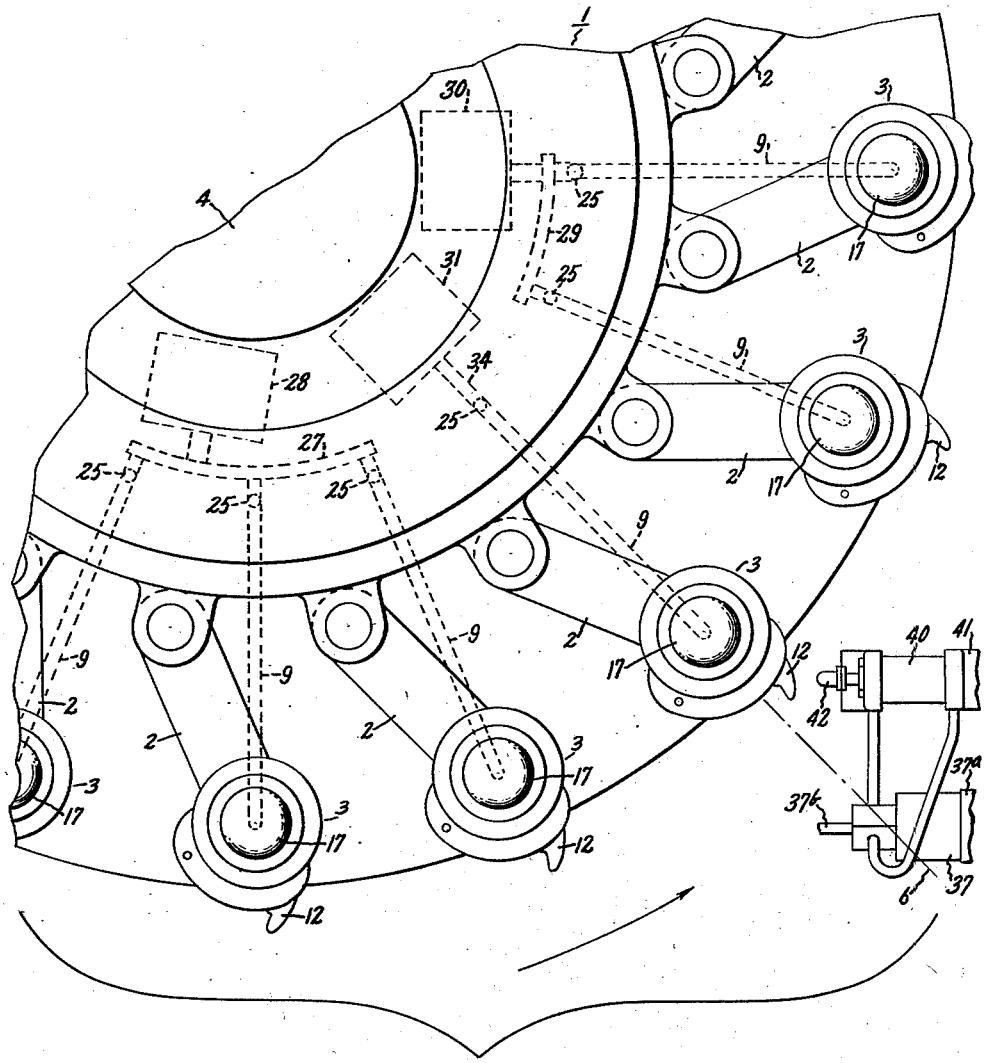

FIG. I.

INVENTOR:
CHARLES T. DE GROAT,
BY Nathan J Cornfeld
HIS ATTORNEY.

May 21, 1957 C. T. DE GROAT 2,792,854
LEAK DETECTION APPARATUS
Filed May 28, 1954 2 Sheets-Sheet 2

INVENTOR:
CHARLES T. DE GROAT,
BY Nathan J Cornfeld
HIS ATTORNEY.

United States Patent Office 2,792,854
Patented May 21, 1957

2,792,854

LEAK DETECTION APPARATUS

Charles T. De Groat, Saratoga, N. Y., assignor to General Electric Company, a corporation of New York Application May 28, 1954, Serial No. 433,024

6 Claims. (Cl. 141—65)

My invention relates to apparatus for exhausting envelopes in the manufacture of electronic tubes and pertains more particularly to new and improved leak detection apparatus adapted to be used therewith.

The equipment employed in manufacturing electronic tubes generally comprises a rotatable turret carrying a plurality of exhaust heads and means for indexing the turret for positioning the heads at various operating stations. For instance each head might first be positioned at a loading station where the tubulation of a tube to be processed is gripped in an exhaust port of the head, then to various other stations where a vacuum is drawn on the head to effect an initial exhaust of the tube, and thereafter to other stations in which a vacuum is continued to be drawn on the head while various tube processing operations such as de-gassing, etc., are performed on the tube. Usually the machine includes a plurality of vacuum pumping means and each is adapted by means of manifolds for evacuating a plurality of heads. Now, occasionally a tube located or held in one of the heads leaks or is unable to retain a vacuum, owing to cracks or poor seals between the elements comprising the tube envelopes. It is desirable to detect these leaking tubes as soon after loading as possible and to close the exhaust heads holding the leaking tubes to the vacuum pumping means, in order thereby to avoid contamination of the vacuum pumping means and consequent spoilage of good tubes being evacuated through the same manifold as leaking tubes. Heretofore, leak detection devices were of course available. However, they usually comprised means for evacuating the envelopes at one station and moving them to another station whereat means was provided to test the previously evacuated tubes for leaks. This resulted in less machine positions available for tube evacuation and postponement in the cycle of certain process steps which required predetermined high degrees of evacuation which were not obtainable as long as two stations were required for the leak detection. Thus, it is desirable that a complete leak detection process be accomplished at one station thereby to provide another station for the evacuation. Further, it is desirable that the leak detecting means be sufficiently sensitive to detect minute leaks in order to insure a high vacuum quality of tubes on the same manifold connection as a leaker. Still further, in order to operate the machine at high tube production speeds without sacrificing tube vacuum quality, it is desirable that the leak detecting means provided to be effective for recovering as quickly as possible following detection of a leak of even the greatest possible magnitude, such as that effected by complete breakage of a tube from its tubulation, in order thereby to insure detection of a small leak that might exist in a subsequently tested tube. Accordingly, the primary object of my invention is to provide a new and improved leak detection apparatus.

Another object of my invention is to provide a new and improved leak detection apparatus adapted for evacuation and testing of an envelope for leaks at a single operating station.

Another object of my invention is to provide, in tube manufacturing equipment, a new and improved leak detection arrangement adapted for insuring general high vacuum quality of tubes processed by the equipment.

Another object of my invention is to provide in tube manufacturing equipment a new and improved leak detection arrangement adapted for facilitating increased tube production without sacrifice of high tube vacuum quality.

Another object of my invention is to provide, in tube manufacturing equipment including vacuum pumping means and a manifold connection adapted for concurrently evacuating a plurality of tubes, a new and improved leak detection arrangement adapted for avoiding the deleterious effects of a leaking tube on good tubes being evacuated on the same manifold connection.

Still another object of my invention is to provide, in tube manufacturing equipment, a new and improved leak detection arrangement of high sensitivity and adapted for recovering quickly following detection of a leak of any magnitude, thereby to insure sensitivity in the detection of a possible minute leak immediately following detection of a leak of great magnitude.

Further objects and advantages of my invention will become apparent as the following description proceeds and the features of novelty which characterize my invention will be pointed out with particularity in the claims annexed to and forming part of this specification.

In carrying out the objects of my invention, I provide a movable exhaust head including means adapted for holding the tubulation of a tube to be tested for leaks in sealed communication with the head. The head is positionable at a leak detection station at which a connection is effected between the head and a constantly operating vacuum pumping means. Pressure sensitive means is provided for operating in response to a pressure change as effected by a tube leak. This means, when operated, effects operation of means for closing the head to the connection. The means for closing the head is permitted to operate only when the head is fully moved to the leak detection station. To increase sensitivity of the arrangement, means is provided for closing the vacuum pumping means to the connection at a predetermined time during the detection operation.

Figure 2:
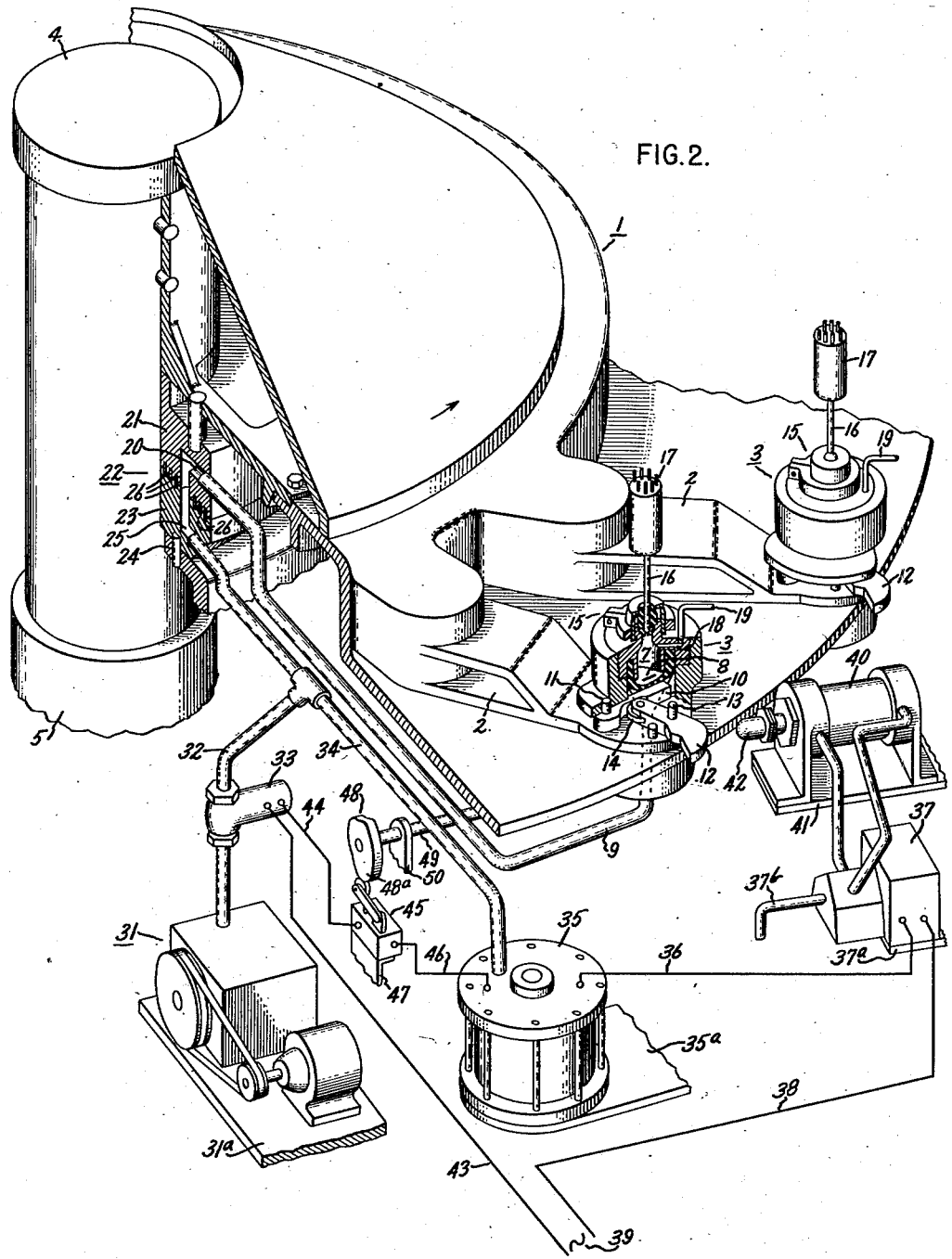

For a better understanding of my invention, reference may be had to accompanying drawing in which:

Fig. 1 is a fragmentary plan view illustrating my invention incorporated in a tube making machine; and Fig. 2 is a fragmentary and somewhat schematic perspective illustration of my invention.

Referring to the drawing, there is shown in Fig. 1 a portion of an electronic tube manufacturing machine including a turret generally designated 1. Suitably secured on a peripheral portion of the turret 1 as by support arms 2 and arranged in spaced relation about the turret is a plurality of exhaust heads 3. As better seen in Fig. 2, the turret 1 is secured on the upper extremity of a vertical post 4 rotatably mounted in a stationary frame 5. By means not shown, the turret 1 is adapted for being actuated intermittently counter-clockwise in the drawing thereby to index the heads 3 at a plurality of operating stations, of which the illustrated station designated 6 is the leak detention station.

As clearly seen in Fig. 2, each head 3 includes an exhaust chamber 7. The bottom side of the chamber 7 is adapted for being closed by a valve 8. For this purpose I prefer employing a pinch-off valve formed of rubber or any similar resilient material. The valve 8 is connected to one end of an exhaust line 9 and is adapted for being operated by a clamp 10 pivotally mounted in the head at 11 for controlling communication between the exhaust chamber and the line. Provided for cooperating with the clamp 10 is a lever 12 pivotally mounted in the head at 13. The lever 12 carries at one end thereof a roller 14 which engages the outer surface of the clamp 10. This surface is so formed that in one rotative position of the lever 12, the roller 14 actuates the clamp 10 inwardly against the rubber valve for pinching off the valve and thereby closing the chamber 7 to the line 9. In another rotative position of the lever 12 the natural resilience of the valve 8 prevents the clamp 10 from closing the valve and thus communication is afforded between the chamber 7 and the line 9.

The heads 3 each further include a compression head generally designated 15 and adapted for being operated to grip and maintain or hold the exhaust tube or tubulation 16 of an electronic tube envelope to be tested in sealed communication with the exhaust chamber 7. Additionally, each of the heads 3 is formed to include a passage 18 to which is connected a line 19 through which compressed air may be admitted for ejecting the tubulation 16 and any fragmentary glass from the chamber 7 following tip-off or sealing of the tube 17 upon completion of the processing thereof. This air ejection arrangement does not comprise part of the present invention but is described and claimed in copending application Serial No. 421,406 of Lloyd S. Hartley and Leonard A. Malewicz filed April 6, 1954 and assigned to the assignee of the present invention.

From the heads 3, the lines 9 extend and are connected to inlet ports 20 formed in suitable spaced relation in the rotatable portion 21 of a rotary valve generally designated 22 and mounted about the post 4. As clearly seen in Fig. 2 the rotatable portion 21 of the rotary valve is suitably secured to the turret 1 and is thereby adapted to rotate therewith. The stationary portion 23 of the rotary valve 22 is suitably secured to a portion 24 of the stationary machine frame. Additionally, the stationary portion 23 is formed to include a plurality of outlet ports 25 corresponding in number and position to the inlet ports 20 in the rotatable portion 21. The rotary valve 22 is further constructed to include a plurality of suitable oil glands 26 on both the inner and outer sides of the ports thereby to render the valve vacuum-tight. The operation of the just-described rotary valve 22 is such that in each of the index positions of the turret 1, one of the inlet ports 20 in the rotary portion 21 of the valve is in communication with one of the outlet ports 25 in the stationary portion 23 of the valve for permitting air and gas passage therethrough. Between index positions, the ports 20 and 25 are out of alignment and communication and air passage across the valve is prevented.

Now, as seen in Fig. 1 a plurality of the outlet ports 25 of the rotary valve may be connected by manifold means to the same vacuum pumping means. For instance, the three outlet ports 25 immediately in advance of the outlet port corresponding to the leak detection station 6 are connected by a manifold 27 to the same vacuum pump generally designated 28, and the two outlet ports 25 immediately succeeding the leak detection station 6 are connected by a manifold 29 to another vacuum pump generally designated 30. Thus, at any of the three operating stations immediately in advance of the leak detection station 6, the vacuum pump 28 will be effective for drawing a vacuum on the lines 9 of the heads 3 at these positions and, depending on the position of the levers 12 of the pinch-off valves 8 and the air-tightness of the envelopes of tubes 17 in these heads, will be effective for evacuating the envelopes. Additionally, at either of the tube stations immediately succeeding the leak detection station 6, the vacuum pump 30 will be effective for drawing a vacuum on the lines 9 of the heads 3 at these stations and, again depending on the position of the levers 12 of the pinch-off valves 8 of the heads 3 at these stations and the air-tightness of the envelope of the tubes 17 in these heads, will be effective for continuing the evacuation of the envelopes. It will be seen that if a head containing a leaking tube is indexed to the position immediately following the leak detection station and the pinch-off valve 8 of the head holding the tube is not closed, the leak will contaminate the vacuum effected by the pumping means and thereby deleteriously affect the evacuation of a good preceding tube since both are being evacuated by the same vacuum pump 30 through the manifold 29. Additionally, the leaking tube, when indexed to the next position, will have the same deleterious effect on a good succeeding tube, since both of these tubes then will be on the same manifold. It will be understood that while I have described the adverse affects of a leaking tube in the two positions following the leak detection station, a leaking tube would have the same deleterious effects anywhere on the machine wherever a plurality of envelopes are adapted for being evacuated by the same vacuum pumping means. Thus, in order to avoid contamination of good tubes being evacuated on the same manifold at the described stations and other stations all about the machine, it is desirous to provide means at the leak detection station 6 for testing for leaks the tube in each head positioned at the detection station and quickly actuating the clamp 10 of the corresponding pinch-off valve 8 to close the exhaust chamber 7 to the vacuum pumping means upon detection of a leak. Further, it is desirous that the leak detecting means be highly sensitive, thereby to detect even the minutest leaks for insuring high vacuum quality of the good tubes processed by the machine and which may be evacuated through the same manifold as a leaker. Still further it is desirous that the leak detection means at station 6 be adapted for operating rapidly in response to a leak and recovering quickly following detection of a leak of even the greatest magnitudes, such as would occur from complete breakage of the tube 17 from its tubulation 16, in order thereby to be conditioned for detecting a minute leak in a tube held in a head subsequently indexed into the leak detection station. This feature is desirous for maintaining high vacuum quality and for enabling high speed operation of the machine without sacrifice of this quality.

My leak detection arrangement provides all the above-mentioned desired features and additionally accomplishes evacuation of a tube in preparation for a leak detection and the leak detection itself at a single station, thus making available a maximum of stations for further evacuation of good tubes preparatory to other steps in the manufacture of the tubes, such as induction heating and cathode breakdown. As seen in both Figs. 1 and 2 my structure includes a vacuum pump generally designated 31 suitably mounted on a portion 31a of the stationary frame of the machine. The vacuum pump 31 is adapted for continuous pumping operation and is connected by a line 32 including a normally open solenoid vacuum valve 33. The pump 31 is operated continuously to insure substantially immediate evacuation of an envelope just as soon as a connection is made with the envelope. Or, in other words, it avoids any waiting for the pump to attain full operating speed. This permits a leak detection operation at the same station and in the relatively short time that the head is at that station. The valve 33 is adapted for interrupting the evacuation of the line 32 by the continuously operating pump, the purpose of which will be brought out in detail hereinafter. The line 32 is connected to a line 34 intermediate its ends. One end of the line 34 is connected to the outlet port 25 of the rotary valve 22 corresponding to the leak detection station 6. The opposite end of the line 34 is connected to a pressure sensitive switching means or device 35 mounted on a portion 35a of the machine frame.

The pressure sensitive device 35 is adapted for completing an electrical circuit therethrough upon detection of a predetermined pressure change in the vacuum connection between it and the exhaust chamber 7 of the head 3 at the detection station 6 of approximately 10 to 300 microns and has a recovery time of approximately 2.3 seconds. This device may be either an aneroid switch, an alphatron or any other switching device of similar sensitivity to pressure changes and is preferably presettable to determine the pressure change at which it will be tripped.

Electrically connected by a lead 36 to one side of the device 35 is one side of a solenoid valve 37 mounted on a portion 37a of the stationary machine frame. The opposite side of the solenoid valve 37 is connected by a lead 38 to one side of a power source generally designated 39. The solenoid valve 37 is normally deenergized and closed and is adapted for preventing a flow of compressed air from a source (not shown) through a line 37b to an air cylinder 40 mounted on a portion 41 of the above-referred to stationary frame of the machine. The cylinder 40 is located for cooperating with the head positioned at the leak detection station 6 and contains a piston 42. The valve 37 is so connected to the cylinder 40 that when energized and thereby opened it first admits compressed air into one end of the cylinder for actuating the piston forwardly to engage the lever 12 of the head 3 at the leak detection station 6 for actuating the associated clamp 10 to close the pinch-off valve 8 thereof and then admits air into the opposite end of the cylinder for retracting the piston. It will be understood that while I have shown a solenoid valve and air cylinder adapted for closing the pinch-off valves, various other means, such as a direct acting solenoid, could alternatively be employed for this purpose.

The other side of the power source 39 is connected by a lead 43 to one side of the above-mentioned vacuum valve 33 in the line 32. The other side of the valve 33 is connected by a lead 44 to one side of a microswitch 45. The other side of the microswitch 45 is connected by a line 46 to the pressure sensitive device 35 at the side opposite the connection to the solenoid valve 37. The microswitch 45 is mounted on a portion 47 of the above-referred-to-stationary frame and is biased to an open position. The microswitch 45 is adapted for being operated by a cam 48 including a high portion 48a and mounted on a shaft 49 journaled in a portion 50 of the stationary frame. By means not shown, the shaft 49 and, therefore, the cam 48 is adapted for being rotated once for each indexing movement of the turret 1. The high portion 48a of the cam 48 is such that it is adapted for closing the microswitch 45 during the time that each exhaust head 3 is indexed into and stopped at the leak detection station 6. It will be understood that means other than the vacuum valve 33 and the cam-operated microswitch 45 can be alternatively employed for interrupting evacuation of the system and controlling this interruption and operation of the air cylinder.

In the operation of my arrangement the constantly operating vacuum pump 31 will be effective for drawing a vacuum on the chamber 7 of the head 3 at the leak detection station thereby to evacuate the tube 17 held in the compression head 15 thereof as soon as the corresponding ports 20 and 25 of the rotary valve 22 commence moving into alignment. At this time a leak in the tube held in the head moving into the detection station might effect a pressure change in the connection to the head sufficient for tripping the device 35. However, it will be seen that it is undesirous to cause actuation of the plunger 42 until the head 3 is fully positioned and stopped at the leak detection station 6, in order to avoid damage to the machine and to insure full closure of the pinch-off valve by actuation of the plunger 42. Thus, even though the device 35 is tripped, a complete circuit to the power source 39 will not be completed until the cam 48 closes the microswitch 45, at which time the head 3 will be positioned and stopped at the leak detection 6. If the device 35 is tripped when the microswitch 45 is closed a circuit will thereby be completed through the solenoid valve 37 for first actuating the plunger 42 for engaging the lever 12 to actuate the clamp 10, thereby to close the pinch-off valve 8, and then for retracting the plunger 42. Thus, the head containing the leaking tube will be closed off and contamination of other pumping means and tubes, when the head holding the leaking tube is indexed about the machine, will be prevented. It will be clear that if the tube envelope is air-tight, or good, no detectable pressure change in the connection will result and the device 35 will be untripped whereby upon the next indexing movement of the turret head carrying the good tube will be moved to the succeeding operating station with the pinch-off valve thereof open.

The vacuum valve 33 is included in the line 32 to increase the sensitivity of the leak detecting arrangement. When the microswitch 45 is closed the valve 33 is energized for closing the line 32 thereby to interrupt the evacuation of the system by the pump 31. As a result any leak in a tube in the head at the leak detection system will result in a greater pressure increase, or accentuation of the pressure changing effect of the leak, than would be the case if the connection were continued to be evacuated by the pump 31. Thus, it is possible for the device 35 to sense and be tripped by pressure increased as effected by leaks smaller than those detectable when the pump 31 is permitted to continue evacuating the system.

It will be seen that my above-described arrangement is adapted for recovering substantially immediately following detection of a leak of even the greatest magnitude, such as the type resulting from complete breakage of the tube 17 from the tubulation 16. That is as soon as a head 3 commences to move out of the leak detecting station, the cam 48 opens the microswitch 45 whereby the vacuum valve 33 is opened permitting immediate commencement of evacuation of the system by the continuously operating vacuum pump 31. Thus, the system is substantially immediately evacuated to insure correspondence thereof with the presetting of the sensing device 35 whereby the arrangement is conditioned for detecting a pressure change resulting from even a minute leak in the tube held in the next head to be indexed into the leak detection station. Owing to its quick recovery, my arrangement prevents movement to the operating station succeeding the leak detection station of a head without detection of a leak in the tube held therein.

It will be seen that my leak detection arrangement requires the use of only one operating station and is adaptable for employment at any position of the machine where it is desirable to detect breakage of the tube 17 from the tubulation 16 and to pinch-off the head holding the broken tube. At such positions high sensitivity would probably not be required and the arrangement employed might be substantially identical to that illustrated in Fig. 2 except for the vacuum valve 33. It will be seen further that my invention is not limited to use in the particular tube making machinery described and illustrated but is equally applicable to any type of envelope exhaust equipment wherein it is desirous to avoid the contaminating effects of a leaking envelope on the vacuum pumping means employed to evacuate the envelope.

While I have shown and described a specific embodiment of my invention, I do not desire my invention to be limited to the particular form shown and described and I intend by the appended claims to cover all modifications within the spirit and scope of my invention.

What I claim as new and desire to secure by Letters Patent of the United Stataes is:

1. Leak detection apparatus comprising, an exhaust head adapted for holding an envelope in sealed communication therewith, evacuating means, a line connecting said evacuating means with said head and through which said evacuating means is effective for evacuating an envelope held in said head, pressure sensitive means connected in said line intermediate said head and evacuating means, said pressure sensitive means being operative in response to a pressure change in said line as effected by a leak in said envelope, normally open valve means interposed in said line intermediate said pressure sensitive means and said evacuating means, enabling evacuation of said envelope and means operative following a predetermined operation of said evacuating means for closing said valve means whereby communication between the portion of said line having said pressure sensitive means connected thereto and said evacuating means is closed, thereby to accentuate the pressure changing effect of a leaking envelope in said portion of said line for increasing the leak detecting sensitivity of said apparatus.

2. Leak detection apparatus comprising, an exhaust head adapted for holding an envelope in sealed communication therewith, evacuating means, a line connecting said evacuating means with said head and through which said evacuating means is effective for evacuating an envelope held in said head, pressure sensitive means connected in said line intermediate said head and evacuating means, said pressure sensitive means being operative in response to a pressure change in said line as effected by a leak in said envelope, normally open valve means interposed in said line intermediate said pressure sensitive means and said evacuating means enabling evacuation of said envelope, means operative following a predetermined operation of said evacuating means for closing said valve means whereby communication between the portion of said line having said pressure sensitive means connected thereto and said evacuating means is closed, thereby to accentuate the pressure changing effect of a leaking envelope in said portion of said line for increasing the leak detecting sensitivity of said apparatus, and means subsequently operative for reopening said valve means thereby to render said evacuating means operative for evacuating said line and recovering said apparatus in preparation for testing a succeeding envelope.

3. Leak detection apparatus comprising only a single exhaust head adapted for holding an envelope in sealed communication therewith, evacuating means, an otherwise closed line connecting said evacuating means with only said head and through which said evacuating means is effective for evacuating said envelope held in said head, pressure-sensitive means connected in said line intermediate said head and evacuating means, said pressure sensitive means being operative in response to a pressure change in said line as effected by a leak in said envelope, normally open valve means interposed in said line intermediate said pressure sensitive means and said evacuating means enabling evacuation of said envelope, means operative following a predetermined operation of said evacuating means for closing said valve means whereby communication between the portion of said line having said pressure sensitive means connected thereto and said evacuating means is closed, thereby to accentuate the pressure changing effect of a leaking envelope in said portion of said line for increasing the leak detecting sensitivity of said apparatus, and means effective for closing communication between said head and said line in response to operation of said pressure sensitive means.

4. In envelope exhaust equipment, only a single leak detecting station, a plurality of movable exhaust heads each adapted for holding an envelope in sealed communication therewith and for being successively positioned at said leak detecting station, a vacuum pump, an otherwise closed line connecting said vacuum pump only with a head positioned at said station and through which said pump is effective for evacuating an envelope held in a head at said station, pressure sensitive means connected in said line intermediate a head at said station and said pump and operative in response to a predetermined pressure change in said line indicative of a leaking envelope, a normally open valve interposed in said line intermediate said pressure sensitive means and pump enabling evacuation of said envelope, means operative when each head is moved into said station for closing said valve in said line whereby communication between a head at said station and said pump is closed, thereby to accentuate the pressure changing effect of a leaking envelope in the portion of said line to which said pressure sensitive means is connected, and means effective for reopening said valve as each head is moved out of said station, thereby to render said pump effective for evacuating said line and recovering said pressure sensitive means in preparation for testing of an envelope held by the next head moved into said station.

5. In envelope exhaust equipment, only a single leak detecting station, a plurality of movable exhaust heads each adapted for holding an envelope in sealed communication therewith and for being successively positioned at said leak detecting station, a vacuum pump, an otherwise closed line connecting said vacuum pump with a head positioned at said station and through which said pump is effective for evacuating an envelope held in a head at said station, each of said heads including a valve operable for closing communication between a head at said station and said line, actuating means at said station adapted when energized for closing the valve in a head at said station, pressure sensitive means connected in said line intermediate said station and said pump and operative at a predetermined pressure increase indicative of a leaking envelope for effecting energization of said actuating means, a normally open valve interposed in said line intermediate said pressure sensitive means and pump enabling evacuation of said envelope, means operative when each head is positioned at said station for closing said valve in said line whereby communication between a head at said station and said pump is closed, thereby to accentuate the pressure changing effect of a leaking envelope in the portion of said line to which said pressure sensitive means is connected, and means enabling energization of said actuating means only when a head is positioned at said station.

6. In envelope exhaust equipment, a plurality of operating stations including only a single leak detecting station, a plurality of movable exhaust heads each adapted for holding an envelope in sealed communication therewith and for being successively positioned at each of said stations, a plurality of vacuum pumps, manifold means for connecting certain of said pumps to heads positioned at a plurality of said operating stations other than said leak detecting station, one of said pumps being connected by an otherwise closed line only to a head positioned at said leak detecting station, each of said heads including a valve operable for closing communication to said head from said manifold means and line, actuating means at said leak detecting station adapted when energized for closing the valve of a head at said leak detecting station, pressure sensitive means connected in said line intermediate a head at said leak detecting station and said pump and operative at a predetermined pressure increase indicative of a leaking envelope for effecting energization of said actuating means thereby to close the head at said leak detecting station before movement thereof into connection with said manifold means at another station for preventing contamination of the vacuum in said manifold means, a normally open valve interposed in said line intermediate said pressure sensitive means and pump enabling evacuation of said envelope at said envelope at said leak detecting station, means operative when each head is positioned at said leak detecting station for closing said valve in said line whereby communication between said head and said one pump is closed thereby to accentuate the pressure-changing effect of a leaking envelope in the portion of said line to which said pressure sensitive means is connected, means enabling energization of said actuating means only when a head is positioned at said leak detecting station, and means effective for reopening said valve in said line as each head is moved out of said leak detecting station, thereby to render said one pump effective for evacuating said line and recovering said pressure sensitive means in preparation for testing of an envelope held by the next head moved into said leak detecting station.

References Cited in the file of this patent

UNITED STATES PATENTS

| | | |
|---|---|---|
| 1,933,322 | Fagan | Oct. 31, 1933 |
| 2,254,905 | Mullan | Sept. 2, 1941 |
| 2,498,456 | Schneider | Feb. 21, 1950 |